United States Patent [19]

Vine

[11] 4,415,013

[45] Nov. 15, 1983

[54] REPAIR FOR THE TIRE SEPARATIONS

[75] Inventor: Fred B. Vine, Britt Township, St. Louis County, Minn.

[73] Assignee: United States Steel Corporation, Pittsburgh, Pa.

[21] Appl. No.: 383,380

[22] Filed: May 28, 1982

[51] Int. Cl.³ .................... B60C 21/02; B60C 21/00
[52] U.S. Cl. ................................. 152/367; 156/97; 156/98; 264/36
[58] Field of Search .................... 156/95-98; 152/367; 264/36

[56]     References Cited
U.S. PATENT DOCUMENTS

| 2,483,010 | 9/1949 | Hooper | 156/98 |
| 3,251,721 | 5/1966 | Johnson | 156/98 |
| 4,093,481 | 6/1978 | Schelkmann | 156/95 |
| 4,234,369 | 11/1980 | Schelkmann | 156/97 |

FOREIGN PATENT DOCUMENTS 439416 2/1975 U.S.S.R. ....................... 152/367

Primary Examiner—Edward C. Kimlin
Assistant Examiner—F. K. Wine
Attorney, Agent, or Firm—George D. Dickos

[57]     ABSTRACT

A method for repairing heavy-duty tires which have experienced separation at the intersection between the tread and sidewall is provided. The method comprises the steps of removing the loose rubber surrounding the separated area, buffing the area to a smooth finish, applying a rubber adhesive to the buffed area, firmly applying a blanket of uncured rubber of approximately one-half inch thickness to the buffed area and curing the rubber to the carcass. Alternatively, a thin blanket of tread rubber may be applied over a thin blanket of cushion gum to a total thickness of applied rubber of approximately one-half inch.

6 Claims, 5 Drawing Figures

REPAIR FOR THE TIRE SEPARATIONS

BACKGROUND OF THE INVENTION

The present invention relates to tire repair and, in particular, to a method for repairing heavy duty truck tires which have experienced separation on their exterior surface at the intersection of the tread and the sidewall, commonly denominated the shoulder, of the tire.

The separation of a tire at the shoulder may be caused by a number of factors. Each of these factors is usually the result of heat buildup within the tire. For example, heat buildup may be due to friction within the tire caused by the frictional contact of the cord plies with one another. This frictional contact and consequent heat buildup between the plies is compounded when the tire is bruised or cut or contains a flaw within the cords. Another possible cause of heat buildup within a tire which may cause the separation thereof is an overload condition which places excesssive pressure on the plies, thus increasing the frictional contact therebetween. Of course, excessive ambient conditions may also add to the heat buildup within a tire enhancing the separation thereof.

Methods of repairing tire separations on the tire's exterior surface are known in the art. However, no such method is effective to accomplish the repair of an extended length of tire separation. In the past, when a production truck tire experienced a separation of over, e.g. twelve (12) inches, the tire was usually discarded as being unrepairable. One method of repair of such a limited length of tire separation appears in U.S. Pat. No. 4,093,481 issued to Schelkmann. That patent teaches the application of a cover to restore the repair area of the tire carcass to its original contour. However, I have found that the attachment of such a cover is only effective in the repair of tire separations of a relatively short length. If a cover restoring the tire to its original contour is applied over a substantial length of the tire circumference, the cover simply will not remain adhered to the tire carcass and will separate therefrom.

The subject invention is directed toward an improved method for accomplishing the repair of exterior tire separations which overcomes, among others, the above discussed problems and which provides an effective, cost-efficient repair for extended length tire separations.

SUMMARY OF THE INVENTION

In accordance with the present invention, there is provided an effective method for repairing tires which have experienced extended regions of separation on the exterior surface between the tread and sidewall. The herein provided method is initiated by the removal of all loose rubber from the separated area of the tire. The thereby exposed area of the tire carcass is then buffed to a smooth finish. Next, a rubber adhesive is applied to the buffed area. A blanket of uncured rubber is then applied to the buffed area and stitched down. It must be understood that the amount of rubber applied is not contemplated to be sufficient to rebuild the tire to its original contour. The thickness of said blanket must be sufficient to protect the tire carcass yet must provide sufficient flexibility so as to avoid a substantial differential in flexure between the blanket and the tire carcass. Typically, this thickness is approximately one-half inch. Finally, the blanket rubber is cured to the tire carcass.

Accordingly, the present invention provides a rapid, effective solution to the problem of the shoulder separation of heavy-duty tires. An extended length separation may now be accomplished thereby obviating the necessity of disposing tires which have experienced such separation.

These and other details, objects, and advantages of the invention will become apparent as the following detailed description of the subject tire repair method continues.

BRIEF DESCRIPTION OF THE DRAWINGS

In the accompanying drawings, I have shown a present preferred embodoment of a tire which has been repaired according to the subject invention wherein.

DETAILED DESCRIPTION OF THE INVENTION

Figure 1:
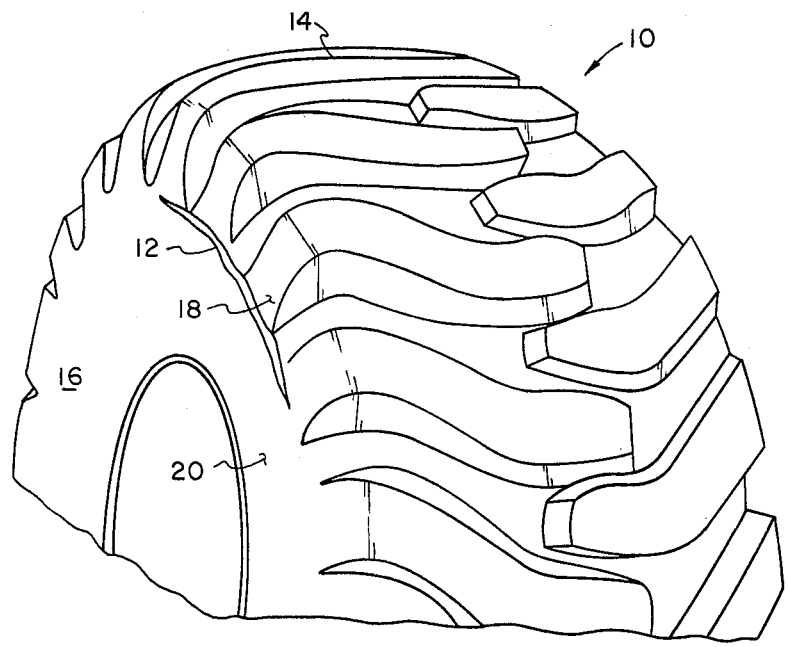
FIG. 1 is a perspective view of a tire which has experienced separation at the shoulder area thereof.
Figure 2:
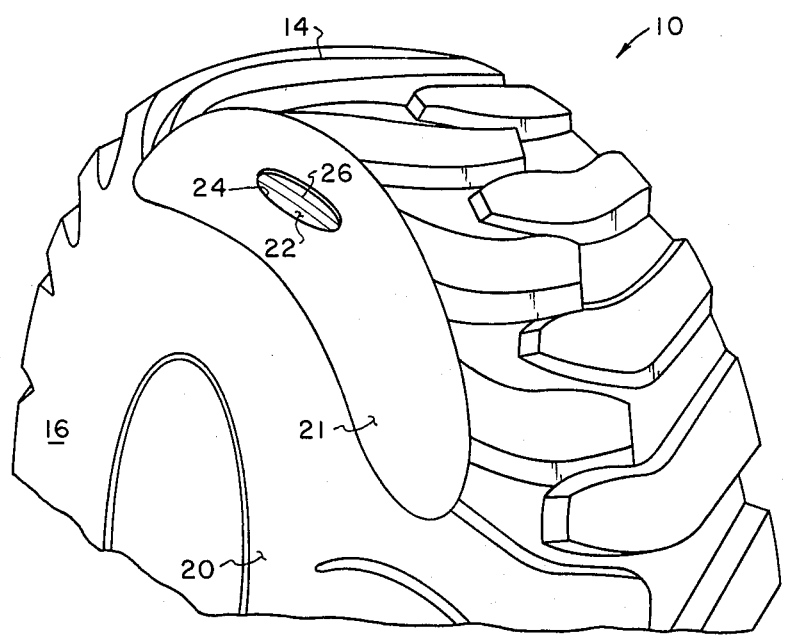
FIG. 2 is a perspective view of a tire which is in the process of repair according to the present method.
Figure 3:
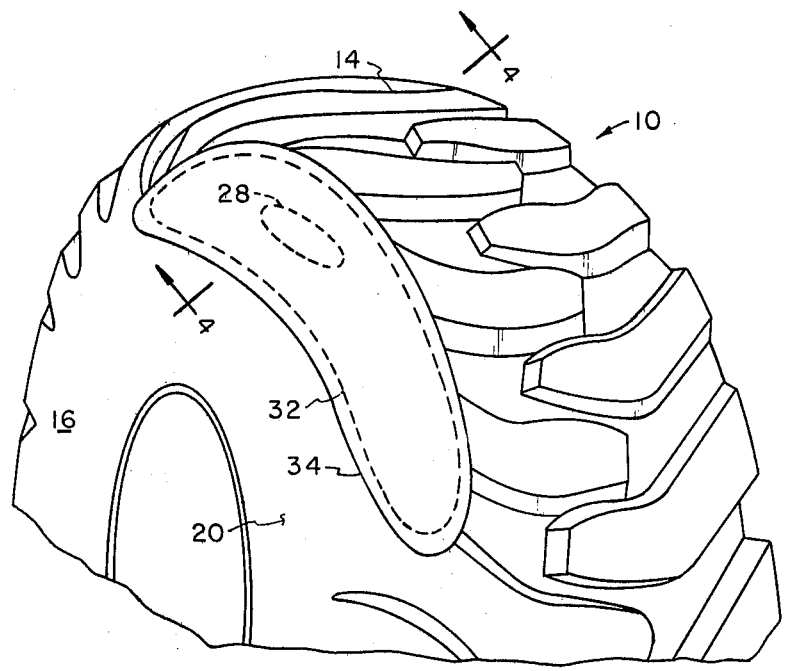
FIG. 3 is a perspective view of a tire which has been repaired according to the herein disclosed method; and, FIG. 4 is a cross-sectional view of a tire which has been repaired according to one embodiment of the present invention.
Figure 5:
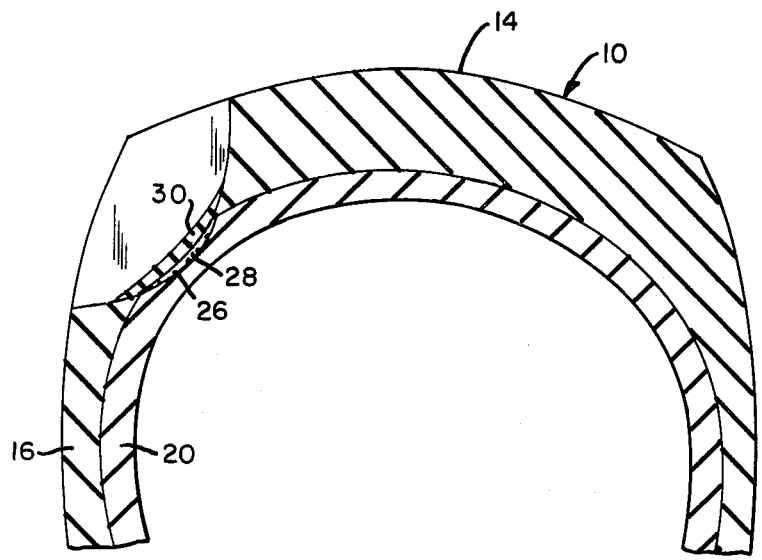
FIG. 5 is a cross-sectional view of a tire which has been repaired according to another embodiment of the present invention.
Figure 4:
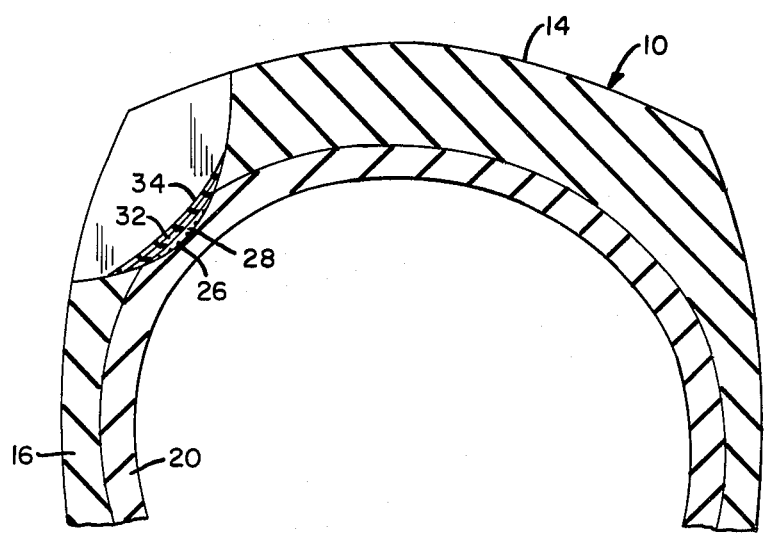

Referring now to the drawings wherein the showings are for purposes of illustrating the preferred practice of the herein disclosed method and not for purposes of limiting same, the figures show a tire 10 having a separation area 12 on its exterior surface between the thread 14 and the sidewall 16. The tire 10 typically comprises a heavy duty tire used, for example, on a production truck. Customary sizes for such tires 10 may be on the order of 36 inches wide for use on a 51 inch diameter wheel.

The first step in the present process for repair of separation 12 is to remove all separated rubber 18 which is no longer in adherence to the tire carcass or cord layer 20. This may be accomplished by carving away any rubber 18 separated from the tire carcass 20 by means of a sharp implement such as a knife blade. The removal of separated rubber 18 must be complete and, as such, the carved-out area thus formed, generally designate 21, will preferably extend slightly into non-separated regions of the tire carcass 20. Following the removal of any separated rubber 18, the carved-out area 21 must be buffed in a manner known to those skilled in the art to a smooth or "velvet" finish. If the carving out of separation area 12 has necessitated intrusion into the cord layer 22 of tire carcass 20, the dished-out cord area 24 must be patched before any surface rubber is applied. Such a patch may, as is known in the art, proceed by first applying bleeder cords 26 to the dished cord area 24, applying a rubber adhesive to area 24 and the covering area 24 with a patch 28 made from uncured or cushion gum rubber of a thickness sufficient to restore the dished-out cord area to the thickness of the tire carcass 20. The patch 28 is then stitched to the tire carcass 14. The stitching process accomplishes the temporary adherence of the patch 28 to the tire carcass 20 by exerting a pressure on the outer surface of the material to be stitched. Generally, in stitching uncured rubber to a tire carcass 20 it is essential to remove all of the air trapped in the interstice between the tire carcass 20 and the uncured rubber. Typically, the pressure is applied to the outer surface of the material to be stitched by means of a roller beginning at the center of the area to be stitched and then moving outwardly therefrom. Following this step, the separation may proceed as if the removal of separated rubber 18 did not require intrusion into cord layer 22.

The next step in the herein disclosed procedure is to apply a rubber adhesive or vulcanizing cement to the carved-out area 21. This adhesive must be one that can withstand the vulcanization temperature of the uncured rubber to be applied. Such cement may be sprayed or brushed on area 21 in a manner also known in the art. Following the application of the adhesive means, a blanket 30 of uncured or cushion gum or bonding rubber is applied to the carved-out area 21. The uncured rubber blanket 30 contemplated herein may consist of any variety of uncured rubber including that known generally as cushion gum or gum rubber. I have determined that the thickness of blanket 30 is very important to its prolonged adherence to tire carcass 20. I have discovered that the reasons for such a lack of adherence of a thick cover, such as one which restores the tire to its original contour, to the tire carcass appear to be two-fold. First, when such a cover is applied to the repair area, the usual heat which is built up within the tire by the flexing thereof as it completes each revolution does not escape from the tire through the thick cover. This causes a buildup of heat at the point of the adhesive used between the cover and the tire carcass which causes the adhesive to fail to retain its adhesive quality and its consequent failure to retain the cover to the tire carcass. An additional reason for the usual separation failure of a repair cover which restores the tire to its original contour is the increased forces applied to the repair area due to the significant differential in flexure present between the cover and the tire carcass. As the cover does not flex as readily as the tire carcass, there is a repeated straining of the bond between the cover and the tire carcass during each tire revolution which contributes to the failure of such bond. To alleviate the above enumerated problems, I have discoverd that if a substantially lesser thickness is afforded blanket 30, in order to relieve the heat and avoid the great differential in flexure from the tire carcass 20, it will remain adhered to the tire carcass 20. Accordingly, the blanket 30 is applied to carved-out area 21 to a thickness not greater than approximately one (1) inch and, preferably, of approximately one-half inch ($\frac{1}{2}$") above the outermost surface of the cord layer 22. It is to be understood that the term "approximately one (1) inch" as utilized herein is to include the range from one and one-half (1$\frac{1}{2}$) inches to seven-eights ($\frac{7}{8}$) inches and the term "approximatly one-half inch" ($\frac{1}{2}$"), as utilized herein is to include the range from one-fourth ($\frac{1}{4}$) to seven-eighths ($\frac{7}{8}$) inches in thickness. As such, the blanket 30 may be applied to area 21 in a number of fashions. For example, the blanket 30 may be applied, e.g., in approximately one-eighth ($\frac{1}{8}$) inch thick layers to a total thickness of approximately one-half ($\frac{1}{2}$) inch. Alternatively, a single layer of approximately one-half ($\frac{1}{2}$) inch thick uncured rubber may be employed. In any event, following the application of the blanket 30, it is stitched down to the tire carcass 20.

If a somewhat tougher but less flexible outer surface of the repair area is desired, a second blanket of rubber 34 of a harder compound than that of first blanket 32 may be applied above said first blanket 32. In such an event, a first blanket 32 of thin, or less than one-half inch thick, uncured rubber is applied and stitched down to the cement prepared carved-out area 21. A thin second blanket 34 of rubber of a harder compound than that of blanket 32 is then applied over the blanket 32 and stitched down. Preferably, the first and second blankets 32 and 34, respectively, are approximately one-fourth ($\frac{1}{4}$) inch in thickness. The term "approximately one-fourth ($\frac{1}{4}$) inch" as utilized herein is intended to include the range from one-half ($\frac{1}{2}$) to one-sixteenth (1/16) inch.

Regardless of whether the applied rubber consists of a combination of a first and second blankets of uncured rubber, 32 and 34, respectively, or a single layer of uncured rubber 30 alone, the applied rubber must then be cured to the tire carcass 20. This curing process may be any such process known to those skilled in the art. By means of example only, the curing process may take place in a vulcan mold which applies heat and pressure to a limited area of the tire 10 circumference. For example only, if a mold of 300° F. is applied to both sides of the repair area with 75 lbs of pressure applied thereto, the curing may proceed at a rate of one (1) inch of combined thickness of tire carcass 20 and blanket 30 or blankets 32 and 34 at the area of the repair per ninety (90) minutes of application. Alternatively, the kettle or autoclave process in which the entire tire 10 is placed in a heated, pressurized vessel may be employed to cure the applied rubber to the tire carcass 20. Again by means of example only, if a kettle pressurized to 85 pounds of steam is maintained at 260° F. the applied rubber will be cured to the carcass 20 at the rate of approximately 7 minutes per 1/32 inch of combined thickness of tire carcass 20 and blanket 30 or blankets 32 and 34 thickness at the area of the repair. Of course, as is known the actual curing time will depend on, among other factors, the specific process and machinery employed, the thickness and compound of the rubber applied and the size of the tire repaired.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. A method for repairing tires which have experienced the separation of exterior rubber from the tire carcass in the shoulder and/or face area of the tire which comprises:
   (a) removing any rubber separated from the tire carcass down to the depth of said separation;
   (b) buffing the area of the tire carcass exposed by said removal to a smooth finish;
   (c) applying a rubber adhesive means to the buffed area;
   (d) covering said buffed area with a blanket of uncured rubber the thickness of which blanket is between one-fourth ($\frac{1}{4}$) and one and one-half (1$\frac{1}{2}$) inches and substantially less than the thickness of the rubber removed from the tire carcass, so as to prevent a substantial differential in flexure between said blanket and said tire carcass and to prevent excessive heat buildup between said blanket and said tire carcass when said tire is in operation;
   (e) stitching said blanket to the tire carcass; and,
   (f) curing the said blanket to the tire carcass.

2. The method as recited in claim 1 wherein the thickness of said blanket of uncured rubber is between one-fourth ($\frac{1}{4}$) and seven-eighths ($\frac{7}{8}$) inch.

3. A method for repairing tires which have experienced the separation of exterior rubber from the tire carcass in the shoulder and/or face area of the tire which comprises:
(a) removing any rubber separated from the tire carcass down to the depth of said separation;
(b) buffing the area of the tire carcass thus exposed to a smooth finish;
(c) applying a rubber adhesive means to the buffed area;
(d) covering said buffed area with a first layer of uncured rubber, said first layer being of a thickness between one-sixteenth (1/16) and one-half (½) inch;
(e) stitching said first layer of uncured rubber to the tire carcass;
(f) covering said first layer with a second layer of uncured rubber of a harder compound than said first layer, said second layer being of a thickness between one-sixteenth (1/16) and one-half (½) inch and the combined thickness of said first layer and said second layer being substantially less than the thickness of the rubber removed from the tire carcass, in order to prevent a substantial differential in flexure between said second layer and said first layer and said tire carcass and to prevent excessive heat buildup between said second layer and said first layer and said tire carcass when said tire is in operation;
(g) stitching said second layer of uncured rubber to said first layer of uncured rubber; and,
(h) curing said first and second layers of uncured rubber to said tire carcass.

4. A repaired tire which had previously experienced the separation of exterior rubber substantially down to or slightly below the tire carcass in the shoulder and/or face area of the tire which comprises:
(a) a tire carcass;
(b) a smooth dished-out area formed by the removal of separated rubber down to the depth of said separation;
(c) a rubber adhesive applied to said dished-out area; and,
(d) a blanket of cured rubber covering said adhesive of a thickness between one-fourth (¼) and one and one-half (1½) inches and substantially less than the thickness of the rubber removed from the tire, in order to prevent a substantial differential in flexure between said blanket and said tire carcass and to prevent excessive heat buildup between said blanket and said tire carcass when said tire is in operation.

5. The repaired tire of claim 4 in which the thickness of said blanket of cured rubber is between one-fourth (¼) and seven-eighths (⅞) inch.

6. The repaired tire of claim 4 in which said blanket of cured rubber comprises a first innermost layer of cured rubber of a thickness between one-sixteenth (1/16) and one-half (½) inch and a second outer layer of cured rubber of a harder compound than said first layer and affixed to said first layer, said second layer of cured rubber being of a thickness between one-sixteenth (1/16) and one-half (½) inch.

* * * * *